United States Patent
Agrati

(10) Patent No.: US 8,096,041 B2
(45) Date of Patent: Jan. 17, 2012

(54) METHOD AND APPARATUS FOR QUALITY CONTROL OF MECHANICAL PIECES

(75) Inventor: Carlo Agrati, Tortona (IT)

(73) Assignee: Dimac S.R.L., Tortona (IT)

( * ) Notice: Subject to any disclaimer, the term of this patent is extended or adjusted under 35 U.S.C. 154(b) by 951 days.

(21) Appl. No.: 12/100,989

(22) Filed: Apr. 10, 2008

(65) Prior Publication Data

US 2008/0269935 A1  Oct. 30, 2008

(30) Foreign Application Priority Data

Apr. 13, 2007 (EP) .................................. 07425211

(51) Int. Cl.
*B23Q 39/04* (2006.01)
*B23Q 7/02* (2006.01)
*B23Q 16/02* (2006.01)

(52) U.S. Cl. ........... 29/563; 29/38 R; 29/557; 74/813 C; 702/84; 382/141; 382/152

(58) Field of Classification Search .................. 29/38 R, 29/38 A, 38 B, 38 C, 563, 33 P, 557–558; 74/813 R, 813 L, 813 C; 382/141, 152; 702/33, 702/84

See application file for complete search history.

(56) References Cited

U.S. PATENT DOCUMENTS

| | | | | |
|---|---|---|---|---|
| 3,938,748 A | * | 2/1976 | Camardella | .................... 29/38 A |
| 4,507,993 A | * | 4/1985 | Silverman et al. | ............... 82/159 |
| 4,823,459 A | * | 4/1989 | Takeda | .............................. 29/563 |
| 6,178,608 B1 | | 1/2001 | Koch | |
| 6,788,805 B1 | * | 9/2004 | Fukushima et al. | ........... 382/141 |
| 7,777,871 B2 | * | 8/2010 | McNamara et al. | ............. 356/72 |

FOREIGN PATENT DOCUMENTS

JP     62-074556 A  *  4/1987

OTHER PUBLICATIONS

European Patent Office Search Report for EP Application No. 07425211.5 filed on Apr. 13, 2007 in the name of Dimac S.r.l.
V. Agoronyan et al. entitled "*Method Appartus Manufacture Boot Double Layer Sole*"Derwent Publications, Ltd. London, GB; 2004-541948, XP002465353, Apr. 20, 2004, abstract only.

* cited by examiner

*Primary Examiner* — Erica E Cadugan
(74) *Attorney, Agent, or Firm* — Steinfl & Bruno LLP

(57) ABSTRACT

Method for quality control of mechanical pieces, such as screws, pins, pivots and similar, intended for mass-production mechanical industries such as automobile and household appliances industries and similar, by means of an apparatus comprising in casings a plurality of operation stations and a piece-holder table which is pitched revolving to convey the pieces to the operation stations. The method comprises: subdividing the operation stations into two groups, a first group comprising fast operation stations with operation times shorter than a predetermined time, and a second group comprising slow operation stations With operation times longer than a predetermined time; providing, for each slow operation station of the second group of slow stations an equal slow operation station angularly distanced by an uneven number of pitches; stopping the piece-holder table at each pitch alternately with said operation times shorter or longer than said predetermined time; deactivating all the slow operation stations during the operation time shorter than the predetermined time. Also a quality control apparatus is disclosed.

7 Claims, 4 Drawing Sheets

METHOD AND APPARATUS FOR QUALITY CONTROL OF MECHANICAL PIECES

CROSS REFERENCE TO RELATED APPLICATIONS

This application claims priority to European Patent Application EP 07425211.5 filed on Apr. 13, 2007, the contents of which are incorporated herein by reference in their entirety.

FIELD

The present disclosure relates to quality control methods, processes and apparatuses. In particular, it relates to a method for quality control of mechanical pieces and a control apparatus for quality control of mechanical pieces.

More specifically, the present disclosure relates to a method for quality control of mechanical pieces, such as screws, pins, pivots and similar, intended for mass-production mechanical industries, such as the automobile and household appliances industries and similar, by means of an apparatus comprising in a casing a plurality of operation stations and a piece-holder table which is pitched revolving to convey the pieces to the operation stations.

The present disclosure also relates to a control apparatus for quality control of mechanical pieces, such as screws, pins, pivots and similar, intended for mass-production mechanical industries, such as the automobile and household appliances industries and similar, by means of an apparatus comprising in a casing a plurality of operation stations and a piece-holder table, of which there are operation stations that perform brief operations, so-called fast stations, and operation stations that perform long operations, so-called slow stations.

BACKGROUND

Apparatuses for quality control of mechanical pieces such as bolts and screws and similar are commonly used to select mechanical pieces which do not come within a specific dimensional tolerance.

In particular, some mechanical pieces such as special bushes, molded or machined nuts or inserts, bar or wire pieces machined on a double lathe, pieces obtained through hot or cold molding based on drawings, punching or machining, must meet a very high quality standard, meeting strict dimensional tolerances.

For example, for a mechanical piece with a diameter of 3 mm and a length of 8 mm, a dimensional tolerance of ±0.01 mm can be required.

In order to detect such tolerances, the control apparatus must be provided with operation stations for controlling the mechanical pieces, comprising artificial vision systems, laser sensors, gauges, feeler pins and so on and with a conveyor belt which positions the mechanical piece near each operation station.

The movement of the conveyor belt is programmed so that the mechanical piece transits at an operation station long enough to allow the station to control said piece.

If the mechanical piece transits in front of all the operation stations and no tolerance defect is detected, the mechanical piece is selected, otherwise it is rejected.

Other control apparatuses are known with a rotating table.

Said control apparatuses comprise an operation station where the mechanical pieces are loaded, for example fed by a piece-holder placed outside the automatic machine, a rotating table where the pieces are deposited by means of the loading operation station and a plurality of control operation stations fixed around the rotating table.

In some control apparatuses, the number and type of control operation stations can be varied, by mounting or removing control operation stations around the rotating table, according to the space available and the size of the single stations.

The table can be rotated at a predetermined angular pitch, i.e. alternating predetermined angular pitch rotations with predetermined time intervals when the rotating table is substantially fixed with respect to the stations.

In order to control the pieces, the loading operation station deposits the mechanical pieces, one at a time, on the rotating table so that the piece transits at the control operation stations; the rotating table is programmed so that the piece stops at each station for a predetermined length of time; sufficient to control the dimensional tolerances.

Several mechanical pieces, loaded one at a time by the loading operation station, can be present at the same time on the rotating table and can be controlled at the same time by the control operation stations.

In this way, the time required by a first control operation station to finish a first control of a first mechanical piece is exploited by a second control operation station to carry out a second control of a second mechanical piece.

Each mechanical piece is either selected or rejected substantially at the end of a rotation of the rotating table, i.e. after stopping for the predetermined time at the control operation stations.

Even if the above-mentioned control apparatuses make it possible to identify defects within very severe dimensional tolerances, they have some evident limitations.

The need to control a high number of mechanical pieces in a short time and the need to guarantee strict tolerance for each piece makes it imperative to optimize the efficiency of the control apparatus, i.e. to increase the number of mechanical pieces which can be controlled in the time unit.

However, with the control apparatuses currently available it is not possible to increase the number of pieces controlled per time unit, since each single control operation station positioned around the rotating table must have a stopping time sufficient to allow said operation station to carry out the corresponding control.

The technical problem at the base of the present disclosure is to increase the efficiency of a control apparatus of the above-mentioned type, increasing the number of pieces which can be controlled per time unit and, at the same time, guaranteeing high precision in the control of dimensional tolerances ensuring, therefore, a stopping time for each control operation station sufficient to carry out the corresponding control. More in particular, the technical problem is to increase the efficiency of a control apparatus for all possible configurations of the control operation stations mounted around the rotating table, determining the speed with which the mechanical pieces are positioned on the rotating table according to the number of control operation stations mounted around it and according to the time necessary to carry out the control at each station.

SUMMARY

According to the present disclosure, in a control apparatus of the type described above, the number of slow operation stations is increased, for example by putting a slow operation station beside each slow operation station already positioned along the rotating table, rotating the table at a predetermined pitch and stopping it for different time lengths, activating during the short time intervals only the fast operation stations, for example the loading operation station and, during the long time intervals substantially all the stations, so that the greater operational capacity of the fast operation stations is compensated by the greater number of slow stations.

On the basis of said solution, the above-mentioned technical problem is solved by a method for controlling the quality of mechanical pieces, such as screws, pins, pivots, etc, intended for mass-production mechanical industries such as the automobile and household appliances industries and similar, by means of an apparatus comprising in a casing a plurality of operation stations and a piece holder table which is pitched revolving to convey the pieces to the operation stations characterized in that it comprises the following steps:

to subdivide the operation stations into two groups, a first group comprising operation stations with operation times shorter than the predetermined time, or fast stations, and a second group comprising operation stations with operation times longer than the predetermined time, or slow stations;

to provide, for each operation station of the second group of slow stations, an equal operation station angularly distanced by an uneven number of pitches;

to stop the piece-holder table at each pitch alternately with said operation times shorter or longer than the predetermined time;

to deactivate the slow operation stations during the shorter operation times.

The technical problem at the base of the present disclosure is also solved by a control apparatus to put the above-described method into effect.

Advantageously, according to the method and apparatus of the present disclosure, the fast operation stations are exploited both during the fast time intervals and during the slow time intervals and the number of mechanical pieces controlled in the time unit is not limited by the operation time of a slow station.

The duration of the stopping time of the rotating table can be established according to the number of slow operation stations, the operation speed of said stations and the complexity of the mechanical piece to be controlled, so making it possible to optimize the efficiency with which each piece is controlled for every possible configuration of the operation stations.

Further advantages according to the control method and apparatus of the present disclosure will become more apparent from the following detailed description of an exemplary but non-limiting embodiment thereof.

DETAILED DESCRIPTION

Figure 1:
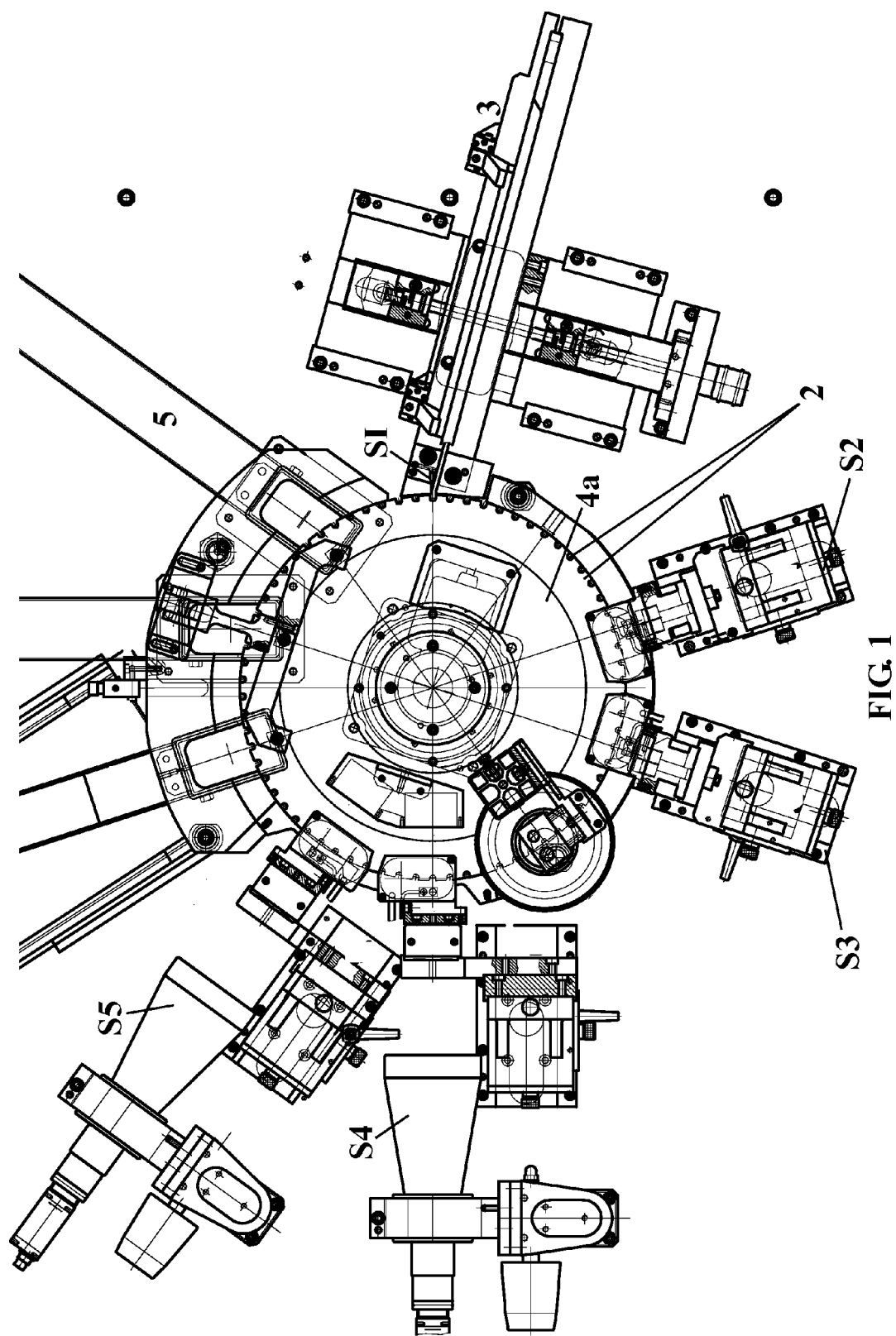
FIG. 1 represents a plant view of an apparatus according to the present disclosure.

With reference to the attached drawings, schematically illustrated and generally indicated with reference number 1, an apparatus is shown for quality control of mechanical pieces 2, such as at least one of screws, pins, pivots and similar, intended for mass-production mechanical industries, such as such as the automobile and household appliances industries and similar.

The apparatus 1 comprises an input channel 3 for moving the mechanical pieces 2 from a loading tank 6 to a rotating table 4, comprising a guide 4a for the mechanical pieces 2. In particular, an operation station S1, intended to load the pieces 2 on the table 4, removes a piece 2 from the input channel 3 and deposits it in the guide 4a, in a loading position 4b.

The rotating table 4 can be rotated in such a way as to alternate a predetermined stopping time, during which the operation station S1, also called loading station S1, loads a mechanical piece 2 into the loading position 4b, with a rotation of the table 4 at a predetermined pitch, in order to position the mechanical piece 2 at another operation station S2, S4, for example an artificial vision system, laser sensor or gauge.

During the stop, the operation station S2, S4, where the mechanical piece 2 is positioned, carries out quality control while the loading station S1 loads another mechanical piece 2 in the loading position 4b.

The operation stations S1, S2, S4 have different operation times.

Figure 2:
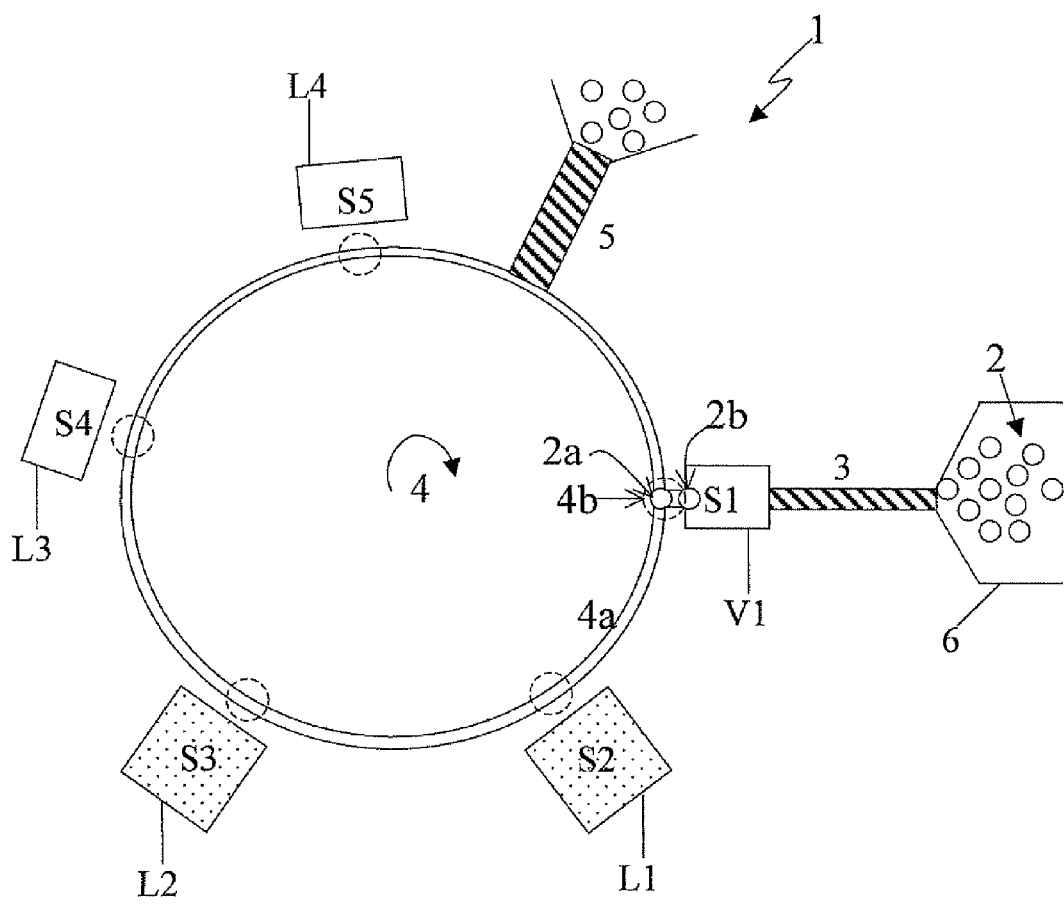
FIG. 2 schematically represents the apparatus of FIG. 1.
Figure 3:
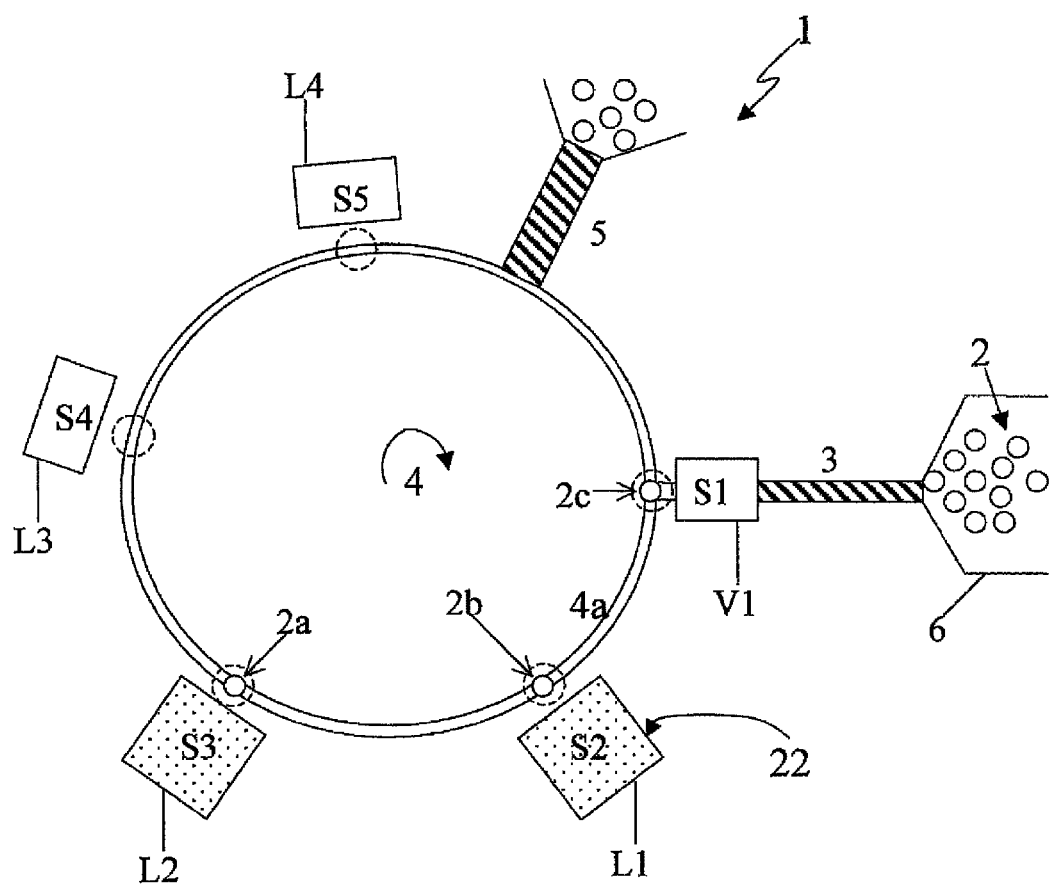
FIG. 3 schematically represents the apparatus of FIG. 1 in another phase of its functioning.
Figure 4:
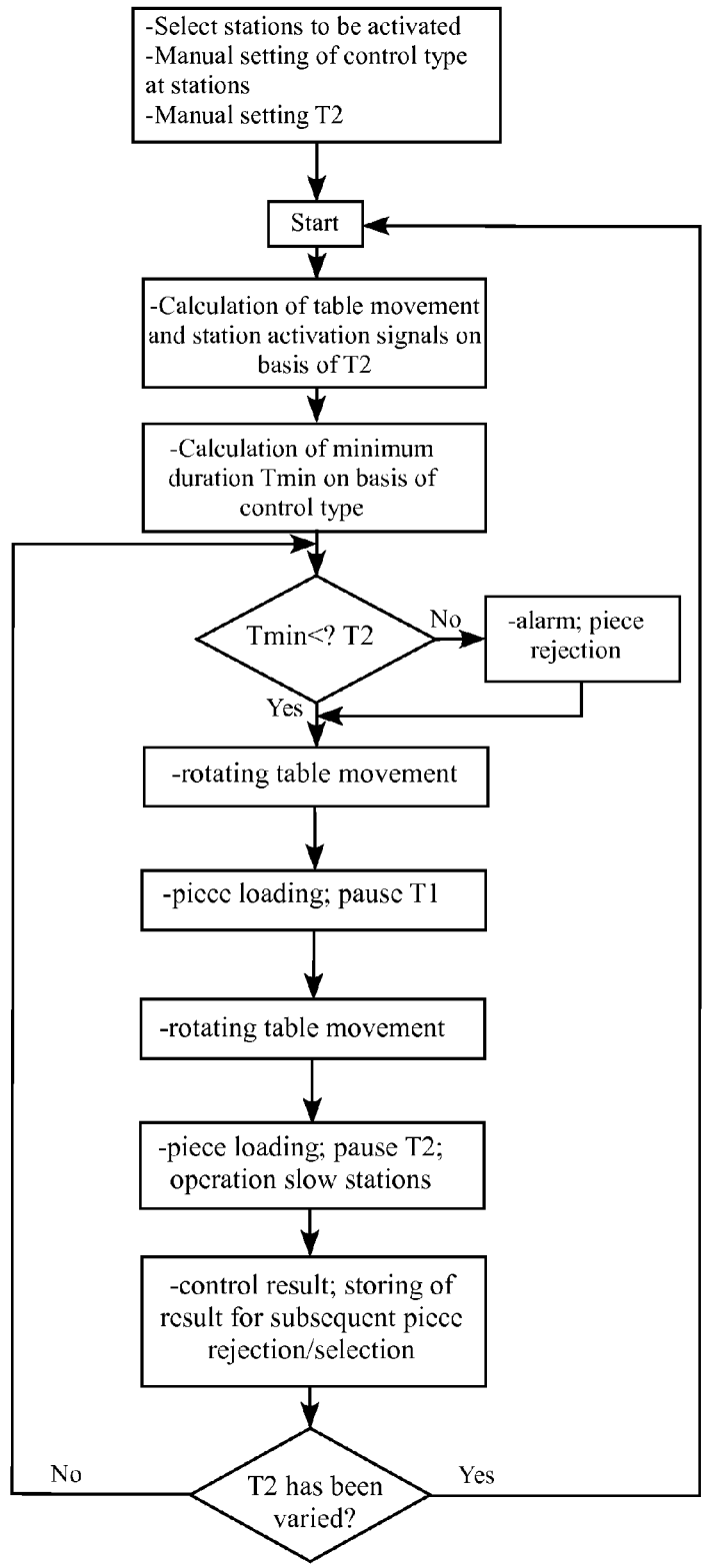
FIG. 4 represents, in a flow diagram, the operation phases of the apparatus according to the present disclosure.

In the description hereunder and with reference to FIG. 2, for exemplary but non-limiting purposes, it is presumed that the operation station S1 is a fast station V1 which requires a short interval of time T1 to acquire a mechanical piece 2 and deposit it in the loading position 4b.

The operation stations S2, S4, however, are slow stations L1, L3 and require a long interval of time T2 compared to the time T1 to carry out a precise control.

According to the method of the present disclosure, the operation stations S1, S2, S4 are divided into two groups, a first group comprising operation stations S1 to be kept active for operation times T1 shorter than the predetermined time, or fast stations V1, and a second group comprising operation stations S2, S4 to be kept active for operation times T2 longer than the predetermined time, also called slow station L1, L3.

The method of the present disclosure also provides, for each slow station L1, L3, an equal slow station L2, L4, placed at said predetermined pitch.

The slow stations L2, L4 are additional stations intended to carry out the same type of control as the slow stations L1 and L3. In particular, the slow stations L2 and L4 are activated at the same time as the slow stations L1 and L3, during the longer operation times T2, in order to carry out controls on different mechanical pieces 2 at the same time.

More in particular, the rotating table 4 is set in rotation according to two different stopping times, a first brief stop T1 and a second longer stop T2 respectively.

During the short stop T1, the station V1 is activated to load a mechanical piece 2 in the loading position 4b, while all the slow stations L1, L2, L3, L4 are deactivated, since they are not able to carry out a control in the time interval T1 of the short stop.

FIG. 2 represents the rotating table 4 in an initial state where the mechanical piece 2a is inserted in the loading position 4b and a second mechanical piece 2b is ready for insertion from station V1.

The rotating table 4 moves by a predetermined pitch, to convey the first mechanical piece 2a, so freeing the loading position 4b in favor of the piece 2b, and a short stop T1 during which the station V1 deposits the second piece 2b in the loading position 4b.

At the end of the short stop T1, the rotating table rotates by another angular pitch, simultaneously positioning the first piece 2a at the operation station L2 and the second mechanical piece 2b at the operation station L1, as schematically illustrated in FIG. 2.

In said configuration, the rotating table 4 carries out a long stop T2, during which the slow stations L1 and L2 carry out the same type of control on two different mechanical pieces, 2b and 2a respectively. During the long stop T2, the loading station is also operative and deposits a third piece 2c in the loading position 4b freed by the previous pitch movement.

At the end of the long stop T2, the rotating table 4 first rotates by an angular pitch to move the piece 2c and free the loading position 4b in favor of a fourth piece 2d, then stops for a brief time interval T1 to load the piece 2d and, subsequently, rotates another angular pitch to position the pieces 2c and 2d at the slow stations L1, L2 respectively.

As a result of the above-described angular pitches and stops, the first piece 2a and the second 2b are transported to the slow stations L3 and L4, so that, during the long stop T2, while the stations L1 and L2 are operating on the third and fourth pieces 2c and 2d, the slow stations L4 and L3 are operating on the first and second pieces 2a and 2b.

In other words, with reference to the configuration of the operation stations in FIG. 1, the method of the present disclosure provides a loading step which comprises depositing at least two mechanical pieces 2a, 2b on the guide 4a of the rotating table 4, carrying out at least one angular pitch between loading of consecutive pieces and at least one corresponding short stop T1 to allow the fast station V1 to load the piece, and a control step comprising a long stop T2 during which the pieces 2a, 2b are simultaneously controlled by the slow stations L1, L2, L3, L4.

Advantageously, the fast loading station V1 is not delayed by the slow stations L1, L2, L3, L4 since the rotating table 4 is rotated, alternately, with a short stop T1 to exploit the loading speed of the fast station V1 and a long stop T2 which gives the slow stations L1, L2, L3, L4 a time T2 sufficient to carry out the corresponding control.

Given the embodiment of FIG. 1, it can immediately be seen that the method according to the present disclosure can be applied to a plurality of configurations where the number of operation stations mounted and fixed around the rotating table 4 can be varied.

In particular, the method provides for the operation stations to be divided into two groups, a first group comprising operation stations to be kept active for operation times T1 shorter than a predetermined time, or fast stations, and a second group comprising operation stations to be kept active for operation times longer than said predetermined time, or slow stations.

For each slow station, an equal slow station is provided angularly distanced by an uneven number of pitches.

In fact, unlike the embodiment described with reference to FIG. 2 where the equal slow stations respectively L1, L2 and L3, L4 are positioned in successions a pair of equal slow stations could be distanced by an uneven number of pitches so that the two mechanical pieces 2a and 2b deposited consecutively in the guide 4a, even if not simultaneously controlled by the pair of equal stations, are controlled by one or the other station of the pair during different long stops T2.

The piece-holder table 4 is stopped at every pitch alternately with said shorter operation times T1 and longer operation times T2 for a predetermined time, the slow stations L1, L2, L3, L4 being deactivated during the shorter operation times T1.

As mentioned above, in a control apparatus, the number and type of stations installed or activated on the rotating table 4 can be varied; consequently, in order to optimize the number of mechanical pieces controlled per time unit, it is necessary to calibrate the duration of the short stop T1 and the long stop T2 according to the maximum operation times of the slow stations L1, L2, L3, L4 and to the operation times of the fast station V1.

More in particular, according to the method of the present disclosure, the control apparatus 1 is set by means of a control interface which makes it possible for the user to select a plurality of operation parameters, comprising the number and type of operation stations to be activated, the duration of the short stop T1 for the fast stations V1, the duration of the long stop T2 for the slow stations L1, L1, L2, L3 and the type of control carried out by the single slow stations L1, L1, L2, L3.

In order to avoid malfunctioning of the apparatus 1, due to incorrect setting of operation parameters, for example to avoid rejection of quality mechanical pieces 2, the method according to the present disclosure provides a minimum duration $T2_{min}$ for the long stop T2.

The minimum duration $T2_{min}$ is calculated according to the type of control set for the slow stations L1, L1, L2, L3, since the more complex the type of control that said slow stations L1, L1, L2, L3 must carry out, the longer the minimum duration $T2_{min}$.

In particular, the method controls that the duration of the long stop T2 is greater than the minimum duration $T2_{min}$, verifying that the slow stations L1, L1, L2, L3 are able to carry out the control in the time T2 set by the user.

For exemplary purposes, a calculation step of the minimum duration $T2_{min}$ is described hereunder, supposing that the slow stations are stations of the photographic type L1, L1, L2, L3 which take one or more photographs of the mechanical piece 2 from different angles. The different photographic angles can be obtained by rotating the mechanical piece on the guide or by moving the photographic station compared to the piece 2.

The operating parameters pertaining to the type of control of the photographic station L1, L1, L2, L3 comprise both the number of shots to be taken per piece and the necessity to rotate the photographic station with respect to the mechanical piece in order to obtain photographs from different angles.

The method determines the minimum duration $T2_{min}$ of the long stop T2 according to the number of shots to be taken and controls that that duration of the long stop T2 is greater than the minimum duration $T2_{min}$. In fact, the greater the number of shots to be taken, the longer the operation times of a photographic station L1, L1, L2, L3.

As said above, the photographic stations L1, L1, L2, L3 can be programmed to move between successive photographs. In this case, the minimum operation duration $T2_{min}$ of a photographic station depends not only on the number of shots to be taken but also on the time needed to move the photographic station.

In this case, the method of the present disclosure calculates the minimum duration $T2_{min}$ by means of a formula of the type:

$$T2_{min} = [(X * \text{number of shots per piece}) + (Y * \text{movement})] ms$$

where X is the time necessary to take a photograph and Y is the time necessary to carry out movement of the photographic station L1, L2, L3, L4.

The time necessary to take a photograph is, for example 80 ms while the time necessary to move the photographic station L1, L2, L3, L4 is approximately 180 ms. The "movement" variable is Boolean, i.e. it is set at value 1 if the photographic station L1, L2, L3, L4 moves or at value 0 if the station does not move.

The control interface makes it possible to vary the operating parameters during activation of the slow stations L1, L2, L3, L4, in particular increasing or decreasing the duration of the long stop T2.

The method according to the present disclosure emits an alarm if the user sets the duration of the long stop T2 at a value lower than the minimum duration T2$_{min}$ and rejects mechanical pieces 2 controlled during the operating time of the apparatus 1 when the long stop T2 is shorter than the minimum duration T2$_{min}$.

The user can also increase the duration of the long stop T2, so as to allow other slow stations to carry out particularly elaborate controls.

The method according to the disclosure also sets the duration of the short stop T1 by means of the control interface, controlling that said duration is sufficient to load a mechanical piece 2 by means of the fast station V1. An alarm signal is generated if the duration of the time T1 is lower than a predetermined value or calculated automatically.

Advantageously, the method according to the present disclosure makes it possible for the user to request automatic setting of the long stop T2, for example at the value of the minimum duration T2$_{min}$, so obtaining maximum number of controls of the mechanical pieces 2.

On the basis of the user's settings, the movement of the table 4 is calculated to be synchronized so as to keep the mechanical pieces 2 stationary in front of an active operation station and to rotate by the angular pitch when a short stop T1 or a long stop T2 is necessary.

If the user's settings cannot be satisfied, for example because two equal stations distanced by an uneven number of pitches are not available, a signal is emitted, for example a visual signal on the control interface or an acoustic signal.

On the other hand, if the user's settings can be satisfied, the method according to the disclosure sends a start-up signal to the rotating table 4, to rotate by an angular pitch and permit loading of a mechanical piece, and a subsequent short stop signal to load said piece on the guide 4a.

At the end of the short stop, the method according to the disclosure sends another start-up signal to the rotating table 4, to rotate by an angular pitch, and a subsequent long stop signal to load a successive mechanical piece and operation of the slow stations L1, L2, L3, L4.

The method according to the present disclosure stores a plurality of dimensional tolerance values for a mechanical piece, detected by the operation stations where the mechanical piece transited. During a step for expelling the pieces from the rotating table 4, which takes place substantially after complete rotation of the pieces on the rotating table, the mechanical pieces with acceptable dimensional tolerances are collected differentially. In particular, a fast expulsion station is provided for the expulsion of the piece from the table 4.

When a user modifies the operating parameters of the apparatus 1 during operation, for example increasing or decreasing the duration of the long stop T2, the method according to the disclosure re-checks the operating parameters, substantially controlling that the duration of the long stop T2 is sufficient for operation of the slow stations L1, L2, L3, L4 and emitting an acoustic or visual signal as described above, if the long stop T2 is too short and the apparatus 1 cannot correctly synchronize the operation stations and the rotating table.

Advantageously, the control method of the present disclosure makes it possible to exploit the fast stations V1 both during the fast stopping times T1 and during the short stopping times T2, so avoiding limits to the number of mechanical pieces controlled in the time unit at the operation time of the slow stations L1, L2, L3, L4.

Advantageously, the duration of the stopping time of the rotating table can be set according to the number of operation stations, the operating speed of said stations and the complexity of the mechanical piece to be controlled, so making it possible to optimize the efficiency with which the pieces are controlled for every possible configuration of the operation stations.

Advantageously, the present disclosure makes it possible to increase, in an unusual manner, the productivity of the control apparatus without however increasing the structural complexity. In fact, the disclosure adapts the apparatus with the sole purpose of increasing the number of positions around the rotating table and the number of operation stations inserted in said positions, so obtaining an increase in productivity by means of electronic control of the operation stations and of the predetermined pitch movement of the rotating table, with stops of differing durations.

Advantageously, according to the present disclosure, safety of the operation of the control apparatus is improved compared to a conventional apparatus since the number of fast operation stations, notoriously known as the most delicate, is kept unaltered.

Finally, the method and the apparatus according to the present disclosure are unusually flexible since the duration of the long stopping time for operation of the slow operation stations and the operating parameters of the operation stations can easily and rapidly be adjusted and during apparatus operation.

Accordingly, what has been shown are a method and apparatus for quality control of mechanical pieces. While such method and apparatus have been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

What is claimed is:

1. A method for quality control of mechanical pieces, by way of an apparatus comprising a plurality of operation stations and a piece-holder table configured to revolve in a pitched manner to convey the mechanical pieces to the operation stations, the method comprising:
   subdividing the operation stations into two groups, a first group comprising fast operation stations to be kept operating with operation times shorter than a predetermined time, and a second group comprising slow operation stations to be kept operating with operation times longer than the predetermined time;
   providing, for each slow operation station, an equally slow operation station angularly distanced therefrom by an uneven number of pitches;
   stopping the piece-holder table at each pitch, alternately alternating the stopping times of the table between said operation times shorter than said predetermined time and said operation times longer than said predetermined time; and
   deactivating all the slow operation stations during said stops of the table wherein the operation times are shorter than said predetermined time,
   wherein a minimum duration of time necessary to carry out operations of the slow-operation stations is calculated, the method further comprising the step of emitting an alarm signal when the longer operation time for a slow operation station is shorter than the minimum duration.

2. The method according to claim 1, further comprising providing a user control interface to set said operation time that is longer than said predetermined time and/or to set one or more operating parameters of said slow operation stations.

3. The method according to claim 2, further comprising varying said operation time that is longer than said predetermined time by way of said user control interface during operation of said operation stations.

4. The method according to claim 3, wherein the calculation of the minimum duration is an automatic calculation, said calculation receiving input of said operating parameters of said slow operation stations.

5. The method according to claim 1, further comprising rejecting the mechanical pieces loaded on the piece-holder table when said longer operation time is shorter than the minimum duration.

6. The method according to claim 1, wherein the mechanical pieces include at least one of screws, pins, and pivots, and are adapted for mass production in mechanical industries.

7. The method according to claim 6, wherein the mechanical industries include automobile industries and household appliances industries.

* * * * *